United States Patent [19]

Goel

[11] Patent Number: 4,654,416

[45] Date of Patent: Mar. 31, 1987

[54] HOMOPOLYMERIZATION OF BICYCLIC AMIDE ACETAL

[75] Inventor: Anil B. Goel, Worthington, Ohio

[73] Assignee: Ashland Oil, Inc., Ashland, Ky.

[21] Appl. No.: 800,868

[22] Filed: Nov. 22, 1985

[51] Int. Cl.⁴ .................................... C08G 73/02
[52] U.S. Cl. ...................... 528/403; 528/409; 528/414; 528/415; 528/423
[58] Field of Search ............... 528/403, 409, 415, 414, 528/423

[56] References Cited

U.S. PATENT DOCUMENTS

| | | | |
|---|---|---|---|
| 3,749,683 | 7/1973 | Tomalia et al. | 528/403 |
| 4,144,211 | 3/1979 | Chamberlin et al. | 528/403 |
| 4,539,376 | 9/1985 | Goel et al. | 528/403 |

Primary Examiner—Harold D. Anderson
Attorney, Agent, or Firm—John F. Jones

[57] ABSTRACT

Novel polyamide containing polymers are obtained by the homopolymerization of a bicyclic amide acetal with a cationic catalyst such as lithium fluoborate.

16 Claims, No Drawings

HOMOPOLYMERIZATION OF BICYCLIC AMIDE ACETAL

This invention relates to a process for the homopolymerization of bicyclic amide acetals to form novel homopolymers and more particularly pertains to a process comprising homopolymerization of mono- and bis-bicyclic amide acetals in the presence of cationic catalysts to produce novel polyamide containing linear and crosslinked polymers.

The homopolymerization of bicyclic amide acetals to form novel linear and crosslinked homopolymers has not been disclosed previously.

I have discovered that bicyclic amide acetals can be homopolymerized in the presence of cationic catalysts by what is believed to be a ring-opening homopolymerization to produce novel polyamide containing linear and crosslinked polymers. The linear polyamide polymers may be used as additives in polyurethane polymer synthesis and also as flexibilizers in polyepoxide polymers, for instance.

The bicyclic amide acetals which are useful in the process of this invention include the mono-bicyclic amide acetals of Formula I and the bis-bicyclic amide acetals of Formulas II and III

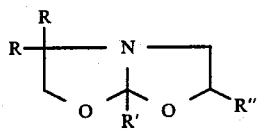

I

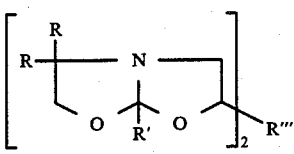

II

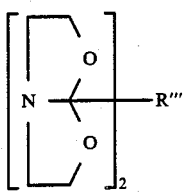

III wherein R, R' and R" represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms and R''' is an alkylene group from 1 to 20 carbon atoms, an arylene group having from 6 to 12 carbon atoms, an alkarylene group having from 7 to 20 carbon atoms, an alkylene ether group having from 1 to 20 carbon atoms or an arylene ether group having from 6 to 20 carbon atoms.

The homopolymerization of a bicyclic amide acetal of Formula I in which R' represents phenyl (Ph) and R, and R" represent hydrogen in the presence of a cationic catalyst is illustrated in the following equation:

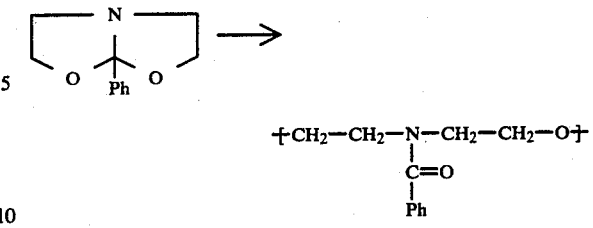

Cationic catalysts useful in the polymerization process of this invention include those having the formula M(X)n wherein M represents an alkali metal or an alkaline earth metal, X represents $BF_4$, $PF_6$, $ClO_4$, $AsF_6$, $SbF_6$ and n represents 1 or 2 and other cationic catalysts such as $BF_3$.ether, $BF_3$.amine, $Ph_2I(X)$ (wherein Ph represents phenyl and X has the foregoing designation), LiCl, $ZnCl_2$ and the like.

In the polymerization process of this invention it is preferred to use from about 0.01 to about 10% by weight of the cationic catalyst based on the weight of the bicyclic amide acetal.

The polymerization process of this invention can be carried out conveniently at a temperature ranging from about 100° C. to 200° C. and preferably in an inert atmosphere such as nitrogen, argon, and the like.

Polymerizable additives such as epoxy resins, oxazoline, lactones, lactam and the like and chain terminators such as alcohols, amines and plasticizers, etc. may also be included in the polymerization.

This invention is further illustrated in the following representative examples.

EXAMPLE 1

To 32.04 g of a bicyclic amide acetal of Formula I wherein R and R" are hydrogen and R' is methyl in a 100 ml round bottom flask containing a magnetic stirring bar was added 0.6 g of lithium fluoborate under a nitrogen atmosphere. The resulting mixture was heated at about 145° C. with continuous stirring and with the nitrogen atmosphere maintained for about one hour. The resulting orange-red liquid was analyzed at this time and it was found that about 65% of the original amide acetal had been consumed. The reaction was then continued under the abovementioned conditions for another four hours and the resulting highly viscous mass was found by GLC to contain no bicyclic amide acetal. No other volatile material was found in the product by GLC analysis. Infrared analysis of the polymeric product showed a strong band at 1620 cm$^{-1}$ (amide group) and a weak band at 1720 cm$^{-1}$ (ester group) and medium broad band at 3350–3400 cm$^{-1}$ (hydroxyl group). A part of this polymeric product (3.24 g) was mixed with 7.4 g of modified methylene bis(phenyl isocyanate) (NCO equivalent weight of 144). Polymerization occurred within 4–5 minutes at room temperature to give a solid polyurethane polymer.

EXAMPLE 2

The procedure of Example 1 was followed using 28 g of a bicyclic amide acetal of Formula I in which R and R" represent hydrogen and R' represents phenyl and 0.5 g of lithium fluoborate. The reaction was carried out at 150°–160° C. for four hours to give a solid thermoplastic polymer which was soluble in N-methyl pyrrolidone (NMP) and dimethyl formamide (DMF). The Tg by differential scanning calorimetry (DSC) for the polymeric product was found to be 43° C. and the thermal decomposition by thermal gravimetric analysis (TGA) occurred at 327° C.

EXAMPLE 3

The procedure of Example 1 was followed using a bicyclic amide acetal of Formula II wherein R and R' represent methyl and R''' represents a butylene group (54 g) and LiCl (0.5 g) and heating the mixture at about 180° C. for four hours. The resulting solid polymer was found to be insoluble in acetone, tetrahydrofuran (THF), DMF and NMP and it did not melt when heated up to 230° C. indicating that the polymer was a crosslinked, thermoset polymer.

EXAMPLE 4

The procedure of Example 1 was followed using 50 g of the bicyclic amide acetal described in Example 1 and 0.1 g of lithium fluoborate. The resulting reaction mixture was heated at 170° C. for four hours to give a sticky solid which was insoluble in acetone and THF.

EXAMPLE 5

The procedure of Example 1 was followed using 150 g of the bicyclic amide acetal described in Example 1 and 1.6 g of lithium fluoborate. The reaction mixture was heated at 140° C. for four hours to give a highly viscous liquid. Infrared analysis of this product showed the presence of hydroxyl groups at 3350–3400 cm$^{-1}$ and amide groups at 1620 cm$^{-1}$. A part of this product (15 g) was mixed with 25 g of dipropylene glycol to give a homogeneous solution. This solution was degassed on a rotary evaporator and was mixed with 75 g of degassed modified liquid methylene bis(phenyl isocyanate). A part of the resulting solution was applied between two one-inch wide and four-inch long fiberglass reinforced sheet molding compound (SMC) adhesive test specimens the adhesive covering a one square inch area in a 30 mil thick bond. The resulting sample was kept at room temperature to cure for one hour followed by postcuring at 100° C. for 30 minutes. The cured sample was then tested for shear strength and the SCM delaminated at about 465 psi in the shear test. The remaining portion of the mixture was poured into a mold prepared by two mold release coated glass plates held apart by ⅛ inch thick spacers. The filled mold was placed in an oven at 100° C. for one hour to cure. The resulting solid polymer sheet was found to have a notched izod inpact strength (ASTM D-256) of 0.5 foot pounds/inch of notch, a heat distortion temperature (ASTM D-648) of 94° C., a yield strength (ASTM D-790) of 19,890 psi and a flexural modulus of 408,623 psi.

I claim:

1. A process for preparing a polyamide containing polymer composition comprising homopolymerizing a bicyclic amide acetal in the presence of a cationic catalyst wherein the bicyclic amide acetal is one of formula I, II or III.

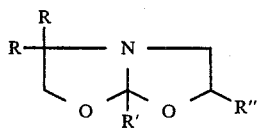

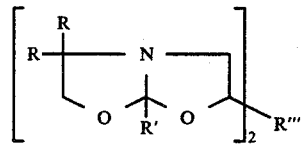

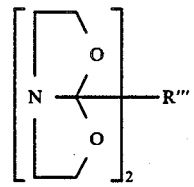

wherein R, R' and R'' represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms and R''' is an alkylene group having from 1 to 20 carbon atoms, an alkarylene group having from 7 to 20 carbon atoms, an alkylene ether group having from 1 to 20 carbon atoms or an arylene ether group having from 6 to 20 carbon atoms.

2. The process of claim 1 carried out at a temperature ranging from about 100° C. to 200° C.

3. The process of claim 2 wherein there is employed from about 0.01 to about 10% by weight of cationic catalyst based on the weight of the bicyclic amide acetal.

4. The process of claim 3 wherein the cationic catalyst is BF$_3$ ether, BF$_3$ amine, LiCl, ZnCl$_2$, Ph$_2$I (X), or one having the formula M(X)m wherein M represents an alkali metal or an alkaline earth metal, X represents BF$_4$, PF$_6$, ClO$_4$, AsF$_6$ or SbF$_6$ and n represents 1 or 2.

5. The process of claim 4 carried out in an inert atmosphere.

6. The process of claim 5 wherein the bicyclic amide acetal is one of Formula I wherein R and R'' are hydrogen and R' is methyl and the cationic catalyst is lithium fluoborate.

7. The process of claim 5 wherein the bicyclic amide acetal is one of Formula I wherein R and R'' represent hydrogen and R' represents phenyl and the cationic catalyst is lithium fluoborate.

8. The process of claim 5 wherein the bicyclic amide acetal is one of Formula II wherein R and R' represent methyl and R''' represents a butylene group and the cationic catalyst is lithium chloride.

9. The polymer composition prepared by the process of claim 1.

10. The composition of claim 9 prepared at a temperature in the range of from about 100° C. to 200° C.

11. The composition of claim 10 wherein from about 0.01 to about 10% by weight of cationic catalyst based on the weight of the bicyclic amide acetal is employed.

12. The composition of claim 11 wherein the bicyclic amide acetal is one of Formula I, II or III

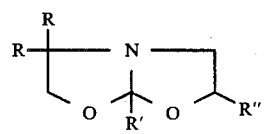

-continued

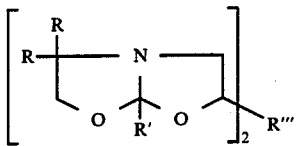

II

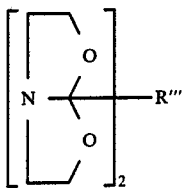

III wherein R, R' and R" represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 20 carbon atoms and R''' is an alkylene group having from 1 to 20 carbon atoms, an alkarylene group having from 7 to 20 carbon atoms, an alkylene ether group having from 1 to 20 carbon atoms or an arylene ether group having from 6 to 20 carbon atoms.

13. The composition of claim 12 wherein the cationic catalyst is $BF_3$ ether, $BF_3$ amine, LiCl, $ZnCl_2$, PhI(X), or one having the formula $M(X)_n$ wherein M represents an alkali metal or an alkaline earth metal, X represents $BF_4$, $PF_6$, $ClO_4$, $AsF_6$ or $SbF_6$ and n represents 1 or 2.

14. The composition of claim 13 wherein the bicyclic amide acetal is one of Formula I wherein R and R" represent hydrogen and R' is methyl and the cationic catalyst is lithium fluoborate.

15. The composition of claim 12 wherein the bicyclic amide acetal is one of Formula I wherein R and R" represent hydrogen and R' represents phenyl and the cationic catalyst is lithium fluoborate.

16. The composition of claim 12 wherein the bicyclic amide acetal is one of Formula II wherein R and R' represent methyl and R''' represents a butylene group and the cationic catalyst is lithium chloride.

* * * * *